United States Patent
Quednau et al.

(10) Patent No.: US 8,960,165 B2
(45) Date of Patent: Feb. 24, 2015

(54) FLUID-GUIDING HOUSING OF AN INTERNAL COMBUSTION ENGINE WITH AN ELECTRICALLY OPERATED HEATING DEVICE

(71) Applicant: Mann+Hummel GmbH, Ludwigsburg (DE)

(72) Inventors: Daniel Quednau, Karlsruhe (DE); Benjamin Ferlay, Cernay la Ville (FR)

(73) Assignee: Mann+Hummel GmbH, Ludwigsburg (DE)

(*) Notice: Subject to any disclaimer, the term of this patent is extended or adjusted under 35 U.S.C. 154(b) by 75 days.

(21) Appl. No.: 13/709,037

(22) Filed: Dec. 9, 2012

(65) Prior Publication Data

US 2013/0146033 A1 Jun. 13, 2013

(30) Foreign Application Priority Data

Dec. 8, 2011 (DE) .......................... 10 2011 120 421

(51) Int. Cl.
 *F02G 5/00* (2006.01)
 *F02M 31/125* (2006.01)
 *F02M 37/22* (2006.01)

(52) U.S. Cl.
 CPC ........... *F02M 31/125* (2013.01); *F02M 37/223* (2013.01)
 USPC .......................................... 123/549; 123/547

(58) Field of Classification Search
 USPC .................................................. 123/549, 547
 See application file for complete search history.

(56) References Cited

U.S. PATENT DOCUMENTS

| | | | |
|---|---|---|---|
| 2,922,867 A | 1/1960 | Crump | |
| 4,600,825 A * | 7/1986 | Blazejovsky | 219/205 |
| 5,054,459 A * | 10/1991 | Reimer et al. | 123/549 |
| 5,180,409 A * | 1/1993 | Fischer | 55/486 |
| 5,800,790 A * | 9/1998 | Imamura et al. | 422/174 |
| 6,020,578 A | 2/2000 | Putz | |
| 6,769,176 B2 * | 8/2004 | Hornby | 29/890.09 |
| 2003/0116490 A1 * | 6/2003 | Keyster et al. | 210/184 |
| 2006/0137587 A1 * | 6/2006 | Aisenbrey | 114/65 R |
| 2006/0157393 A1 * | 7/2006 | Jones et al. | 210/104 |
| 2009/0139987 A1 * | 6/2009 | Handa | 219/628 |
| 2010/0200485 A1 * | 8/2010 | Parra Navarrete et al. | 210/184 |

OTHER PUBLICATIONS

German Office Action of DE 102011120421.4.

* cited by examiner

*Primary Examiner* — Lindsay Low
*Assistant Examiner* — Tea Holbrook
(74) *Attorney, Agent, or Firm* — James Hasselbeck

(57) ABSTRACT

A fluid-guiding housing, in particular a gas-, oil-, fuel- or water-guiding housing (12), of an internal combustion engine, in particular of a motor vehicle, with an electrically operated heating device (33) for heating fluid in the housing (12) is described. At least one wall (18, 20) of the housing (12) is equipped with an electrically heating textile (32).

7 Claims, 2 Drawing Sheets

FLUID-GUIDING HOUSING OF AN INTERNAL COMBUSTION ENGINE WITH AN ELECTRICALLY OPERATED HEATING DEVICE

CROSS REFERENCE TO RELATED APPLICATIONS

This application claims the benefit of foreign patent application DE 102011120421.4 filed in Germany on Dec. 8, 2011, and which is hereby incorporated by reference in its entirety.

TECHNICAL FIELD

The invention relates to a fluid-guiding housing, in particular a gas-, oil-, fuel- or water-guiding housing, of an internal combustion engine, in particular of a motor vehicle, with an electrically operated heating device for heating fluid in the housing.

BACKGROUND OF THE INVENTION

A filtering device for fluids, in particular for fuels of an internal combustion engine, is known from DH 10 2009 058 159 A1. The filtering device features an electrical heating for heating fluid that flows through the filtering device for being filtered. A filter element is disposed in a filter housing. The heating features at least one heating web, which encloses the filter element at least partially. The heating web is disposed on a supporting film. The fluid can flow against the supporting film, which is connected with a dimensionally stable frame.

SUMMARY OF THE INVENTION

An object of the present invention to realize a fluid-guiding housing of the above-mentioned type in which the heating device for heating the fluid is constructed as simple and as robust as possible. Furthermore, the heating device shall heat the fluid in the housing efficiently and reliably. Apart from that, the heating device shall be realized with as few components as possible.

This object is solved according to the invention by the fact that at least one wall of the housing is equipped with an electrically heating textile.

According to the invention, the heating device features an electrically heating textile. The electrically heating textile is connected with a current source, preferably with the current supply of the internal combustion engine or the motor vehicle.

Advantageously, a control means can be provided that allows controlling, preferably regulating the current supply in the heating textile and therefore the heat output. The electrically heating textile is made of fibers or yarns. At least one part of the fibers or yarns is electrically conductive. The textile can be realized in an easy way preferably by weaving or weft knitting. The textile can also be realized by other textile technologies, in particular by embroidery, warp knitting or Raschel knitting. A textile can simply be molded. Thus, it can be flexibly applied to, in or on the wall of the housing. The textile can be adapted easily to the shape of the wall It can in particular easily fit tightly to the wall. In this way, different and even complex shaped walls can be provided with the textile. The textile can be supported by the wall of the housing. Thus, no additional support element, in particular no additional dimensionally stable frame, such as with the filtering device known from prior art, is required. The textile can also be connected with the wall in a way that it can further stabilize it. By integrating a textile structure into, to or on the wall of the housing it is possible to enhance its stiffness and strength. The supporting function of the housing can be enhanced by the textile. Thus, additional reinforcement measures such as ribs or beads are not required. In this way, a simple, cost-effective and reinforced matrix material can be used for the housing, in particular for the wall, which is provided with the textile Furthermore, in case of external forces that have an impact on the housing, in particular in case of an accident, the textile can easily prevent it from breaking thus preventing fluid from leaking. This is of great advantage, in particular when using fuel filters in the automotive industry, because for safety reasons the requirements to break resistance of the housing have increased. The textile can be disposed in such a way that it is in direct contact with the fluid and that it can heat it immediately. Advantageously, the fluid can flow against or around it. It can also be disposed in such a way that the fluid flows through it. In this case, the textile can further fulfill a filtration function for removing particles from the fluid and/or a coalescence function for separating water from the fluid, in particular fuel or oil. However, the textile can also be disposed in the wall or embedded in it completely. The textile can then heat the fluid indirectly via the wall of the housing.

In an advantageous embodiment, the electrically heating textile can be a fabric or knitted fabric with electrically conductive fibers, in particular yarns. The electrically conductive fibers can heat the textile by means of the current source to the required temperature. A fabric or knitted fabric can be realized easily with conventional textile processing methods.

Advantageously, the fabric or knitted fabric can feature electrically non-conductive fibers, in particular yarns. The electrically non-conductive fibers, in particular yarns, can easily be woven or knitted with the electrically conductive fibers, in particular yarns. According to the requirements for the textile, the mixing ratio between electrically conductive fibers and electrically non-conductive fibers and/or their distribution can vary. By mixing electrically conductive fibers and electrically non-conductive fibers, the properties of both types of fibers can be optimized and combined with each other, preferably independently from each other. Advantageously, the electrically non-conductive fibers can feature other mechanical properties, in particular with respect to strength and/or elasticity than the electrically conductive fibers. Advantageously, the electrically non-conductive fibers can feature other, in particular optimized, filter properties and/or coalescent properties, which can have a positive impact on a filter function and/or a water-separating effect of the textile.

Furthermore, the electrically heating textile can advantageously be resilient. The resilient textile can compensate for deformations of the housing, in particular due to vibrations and/or temperature fluctuations. A resilient textile can be connected with the wall by a mechanical pretension. Thus, the mechanical properties of the housing can be further enhanced.

In another advantageous embodiment, the electrically heating textile can be disposed on the side of the at least one wall facing an interior area of the housing. Thus, the fluid to be heated can directly flow against the electrically heating textile. The heat transfer between the textile and the fluid can thus be enhanced. This can have a positive effect on the energy balance when operating the heating device. The textile can be disposed advantageously on the surface of the wall. It can thus be mounted also subsequently in an already existing housing. A flat fixing on the wall can enhance the stabilizing effect of the textile.

In another advantageous embodiment, the electrically heating textile can be integrated in the at least one wall of the housing. In this way, the stability of the connection between the textile and the wall can be enhanced. The textile can be integrated advantageously in the wall. In this way, the textile can be protected in the wall. Furthermore, the support function of the textile can be enhanced. The textile can be integrated advantageously in the wall with only one side. Thus, the fluid can flow against the free side of the textile facing the interior area, allowing the fluid to be in direct contact with it. This can enhance the heat transfer.

Advantageously, the at least one wall can be made of synthetic material and the electrically heating textile can be embedded at least partially in the at least one wall, in particular overmolded or molded into the wall. Advantageously, the textile can be simply overmolded with synthetic material during the manufacture of the plastic housing. The textile can also be integrated in the wall during a blow mold process for the manufacture of the housing. The textile can thus be connected easily with the wall and embedded therein. An additional process step for connecting the textile with the wall is not required. With the synthetic material of the wall and the textile, a kind of composite structure can be realized. This can have a positive effect on the stability of the wall, its bearing capacity and stiffness.

As an alternative, the electrically heating textile can be advantageously disposed, in particular glued on one surface of the at least one wall of the housing. Thus, the textile can be easily disposed, also subsequently, on the surface of the at least one wall, By gluing, a stable connection, even on the whole surface, can be realized between the textile and the wall. The textile can therefore be connected with a wall, into which the textile cannot be embedded, in particular due to manufacturing reasons. In this way, the textile can be connected in particular also with ceramic housings or metal housings. When using the textile in conjunction with a metal housing, electrically conductive elements of the textile can be advantageously electrically isolated against the metal of the housing.

Advantageously, the fluid-guiding housing can be part of a filter for fluid, in particular air, fuel, oil or water, or of an oil pan or a crankcase vent line. When using the textile for a filter, the fluid to be filtered can be heated very efficiently in order to prevent in particular a blocking of the fluid at temperatures which are in the range of the freezing point of the fluid. By heating with the textile, the viscosity of the fluid can be reduced which can have a positive effect on the differential pressure between the clean side and the raw side of the filter. This can in particular be of advantage when using it in motor vehicle in cold environment. When using the textile with an oil pan, the oil contained in the oil pan can be heated efficiently with the textile so that the viscosity is reduced. When heating the crankcase vent line, the crankcase gas can be easily heated.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
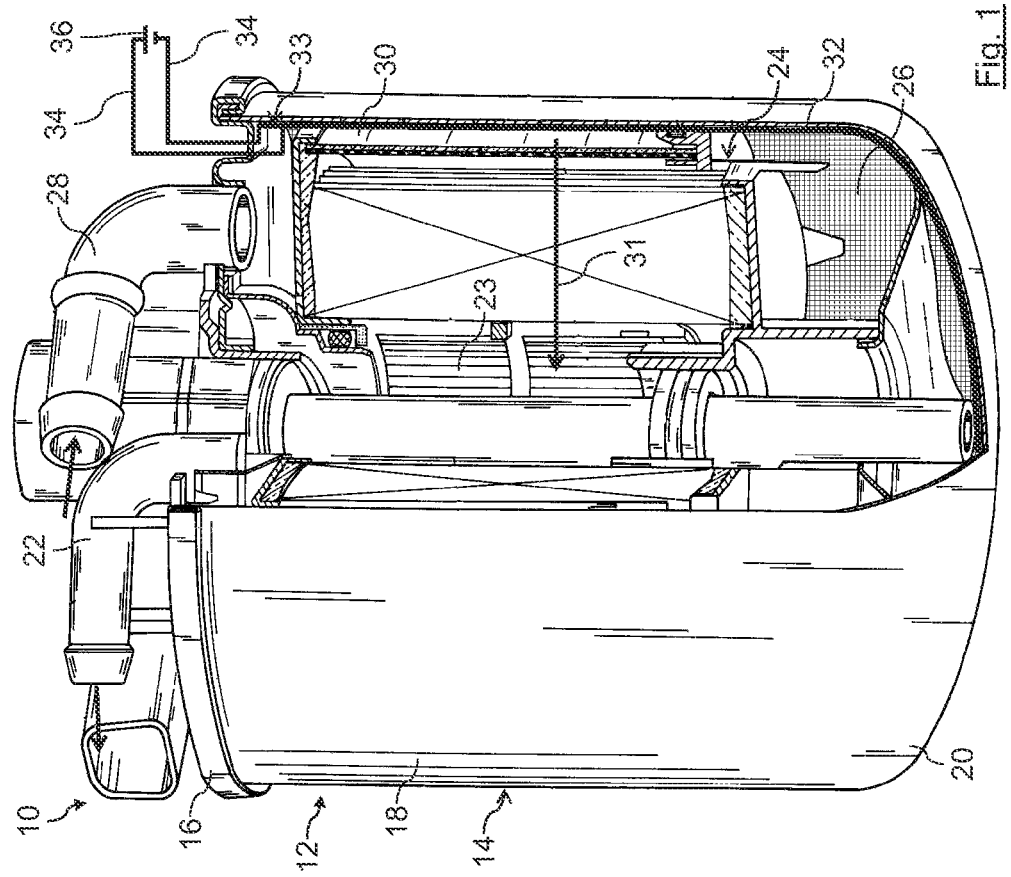
FIG. 1 schematically depicts a half section of a fuel filter of an internal combustion engine of a motor vehicle with a heating device for heating the fuel.

Identical components in the figures have the same reference numerals. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Other advantages, features and details of the invention will become apparent from the following description where examples of the embodiment of the invention will be explained in detail with reference to the drawing. A person of skill in the art will expediently consider the features disclosed in combination in the drawing, the description and the claims also individually and combine them to other meaningful combinations as schematically shown in:

In describing in detail embodiments that are in accordance with the present invention, it should be observed that the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In FIG. 1, a fuel filter for liquid fuel of an internal combustion engine of a motor vehicle is provided with the reference numeral 10. The fuel filter 10 is disposed in a fuel supply line of the internal combustion engine not shown and which is of no interest here.

The fuel filter 10 includes a filter housing 12 with a cylindrical pot 14, which is closed by a cover 16. The pot 14 is made of synthetic material. It is connected with the cover 16 via a liquid-tight flare coupling. The cylindrical pot 14 has a closed cylindrical peripheral wall 18, which merges into a pot bottom 20 in the interior area. An outlet port 22 for the filtered fuel, which is connected with an interior area 23 of a filter element 24 of the fuel filter 10, is provided in the cover 16.

The represented filter element 24 indicated as a round filter element, although the invention is not so limited. The interior area 23 of the filter element 24 forms its clean side.

The filter element 24 is disposed in an interior area 26 in such a way that it separates an inlet port 28 for the filtered fuel tightly from the outlet port 22. The inlet port 28 is also located in the cover 16. The inlet port 28 is connected with a raw-sided annular space 30 surrounding the filter element 24 radially outside. The filter element 24 is flowed through by the fuel from the annular space 30, radially outside, to the interior area 23, radially inside, shown in FIG. 1 by an arrow 31.

On the interior sides of the peripheral wall 18 and the pot bottom 20 facing the interior area 26 of the filter element 24, an electrically heating textile 32 of a heating device provided with the reference numeral 33 is disposed on the whole surface. The textile 32 is embedded on one side in the synthetic material of the peripheral wall 18 and the pot bottom 20. The fuel to be filtered can thus flow directly against the free surface of the textile 32 facing the interior area 26 and heat it. In this way, the fuel is heated before flowing through the filter element 24. Thus, the flowability of the fuel is enhanced and a differential pressure between the raw side and the clean side of the filter element 24 is reduced.

The electrically heating textile 32 is a blended fabric of electrically conductive yarns and electrically non-conductive yarns. Before being connected with the pot 14, the textile 32 is separately molded. Furthermore, before being connected with the pot 14, the textile 32 is elastically extendible.

The textile 32 is connected via power supply lines 34 and via a control unit, not shown here and which is of no interest, with a current source 36. The power supply lines 34 lead through the cover 16 in a way that is of no interest. The current source 36 is the on-board power supply of the motor vehicle. The control unit is part of the thermal management of the internal combustion engine. It can be additionally connected with the corresponding temperature sensors, which can be located in or on the fuel filter 10. The control unit can regulate the supply current for the textile 32, and thus its heat output. The textile 32 allows, for example, to introduce a heating surface output of up to approx. 1250 Watt/m2 or more.

For manufacturing the fuel filter 10, the pot 14 and the cover 16 are manufactured separately. The pot 14 is made of synthetic material according to an injection molding process. To do this, the textile 32 is placed in a corresponding mold. The molten synthetic material is then introduced into the mold. The synthetic material now penetrates the textile 32 partially. The textile 32 is overmolded on one side and embedded over the whole surface on the side of the peripheral wall 18 and of the pot bottom 20 facing the interior area 26. After hardening of the synthetic material, the textile 32 is firmly integrated with one side in the interior side of the pot 14. The textile 32 stabilizes the pot 14. It provides an additional stiffness to the pot 14. Thus, the textile 32 prevents, for example in case of external forces acting on the pot 14, for example in case of an accident, that it breaks fuel can leak.

Figure 2:
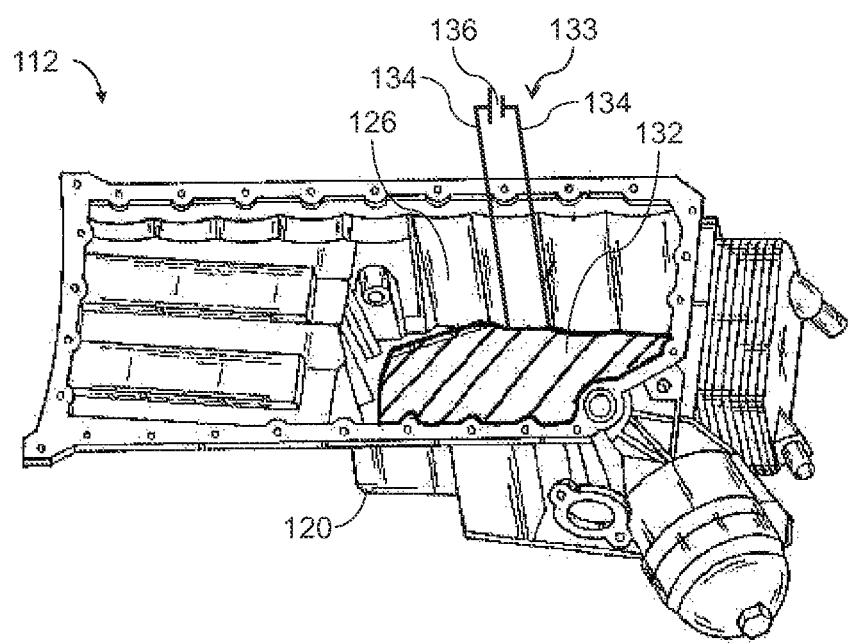
FIG. 2 schematically depicts an isometric representation of an oil pan of an internal combustion engine of a motor vehicle with a heating device for heating the engine oil.

FIG. 2 shows an oil pan 112 for engine oil in an internal combustion engine of a motor vehicle, which is otherwise not shown. The oil pan 112 is made of synthetic material. On a side of a bottom 120 of the oil pan 112 facing an interior area 126 is disposed an electrically heating textile 132 of an electric heating device 133 which corresponds substantially to the electrically heating textile 32 of the fuel filter 10 in FIG. 1. The textile 132 is embedded in the same way on one side in the surface of the bottom 120. It is in direct heat contact with the engine oil there on the side facing the interior area 126. Thus, the engine oil can be heated easily and efficiently by means of the textile 132.

In analogy to the textile 32 of the fuel filter 10 in FIG. 1, the textile 132 is connected via power supply lines 134 and a control unit not shown with the current source 136 of the on-board power supply of the internal combustion engine.

The manufacture of the oil pan 112 and the connection with the textile 132 is realized in analogy to the manufacture of the pot 14 of the fuel filter 10 in FIG. 1 according to an injection molding process. The textile 132 is overmolded with synthetic material on one side and embedded at the bottom 120 of the oil pan 112. After hardening of the synthetic material, the textile 132 forms an additional mechanical reinforcement of the bottom 120 of the oil pan 112 in a kind of a composite structure.

In the above described examples of an embodiment of a fuel filter 10 and an oil pan 110, the following modifications are among others possible:

The invention is not limited to a fuel filter 10 and an oil pan 110 of an internal combustion engine of a motor vehicle. Rather, it can also be used with different components of an internal combustion engines that feature a fluid-guiding housing. Instead of fuel or oil, gas, for example air, or water can flow through the fluid-guiding housing. The invention can be used wherever fluid is to be heated in a fluid-guiding housing. It can also be used outside the automotive technology, for example with industrial engines. Instead of being used with a fuel filter, the invention can also be used with another filter, for example a water filter, an air filter or an oil filter.

For the fuel filter 10, it is also possible to use a filter element of different shape, for example with an oval or angular base area or a flat filter element instead of the round filter element 24.

Instead of fabric, the electrically heating textile 32; 132 can also be realized by other textile technologies, in particular by embroidery, warp knitting or Raschel knitting. The electrically heating textile 32; 132 can also be made exclusively of electrically conductive yarns. Instead of yarns, only fibers can be used.

Rather than being resilient, the textile 32; 132 can also be non-resilient. It can also be resilient in certain directions only.

Instead of being integrated in a surface of the peripheral wall 18, the pot bottom or the bottom 120, the textile 32; 132 can also be integrated completely in the respective wall, for example completely overmolded. The heating of the fluid can then be realized indirectly via the synthetic material of the peripheral wall 18, the pot bottom 20 or the bottom 120.

Instead of being integrated in the peripheral wall 18, the pot bottom 20 and the bottom 120, for example cast or molded by means of a blow-molding process, the textile 32; 132 can also be glued or connected in another way by means of a superficial connection with the textile 18, the pot bottom 20 and the bottom 120.

Instead of being manufactured by means of an injection molding process, the pot 14 or the oil pan 114 can also be manufactured by means of a blow-molding process, and the textile 32; 132 can be embedded accordingly in the synthetic material.

The pot 14 and the oil pan 112 can also be prefabricated separately without the textile 32; 132. The textile 32; 132 can be placed on the corresponding surface of the prefabricated pot 14 or the prefabricated oil pan 112 and overmolded with more synthetic material, or connected with the pot and the oil pan 112, respectively, in a different way, for example by means of gluing.

Instead of synthetic material, the pot 14 or the oil pan 112 can also be made of a different material, for example metal or ceramic or a material mix.

The current source 36; 136 can also be a current source that is separated or that can be separated from the on-board power supply.

The heating device 33; 133 can, for example, feature its own control unit and can, for example, also be connected subsequently with the on-board power supply via a detachable connection.

As for the fuel filter 10, power supply lines 34 can also lead through the pot 14 instead of through cover.

The textile 32 can also be disposed in the fuel filter 10 simply on the peripheral wall 18 or simply on the pot bottom 20. Instead of being closed circumferentially, the textile 32 can also be disposed only section-wise on the peripheral wall 18 and/or on the pot bottom 20.

In conjunction with the corresponding peripheral wall 18 and the pot bottom 20, the textile 32 can also be realized as a kind of composite structure.

Instead of being disposed at the bottom 120 of the oil pan 112, the textile 132 can also be disposed on the walls of the oil pan 112. The textile 132 can be closed on the whole surface or only section-wise on the bottom 120 as well as on the sidewalls of the oil pan 112.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A fluid-guiding housing (12; 112) of an internal combustion engine, comprising:
    a housing (12; 112) enclosing an interior space within, the housing including
        a fluid inlet;
        a fluid outlet;
        an electrically operated heating device (33; 133) arranged within the interior space and heating fluid in the housing (12; 112);
    wherein at least one wall (18, 20; 120) of the housing (12; 112) is equipped with an electrically heating textile (32; 132) secured to said at least one interior side of the at least one housing wall;
    wherein the electrically heated textile is a woven or knitted textile fabric including electrically conductive fibers or yarns,
    wherein the electrically conductive fibers or yarns of the electrically heated textile are arranged on and secured directly onto the interior side of the at least one housing wall and fit tightly against, cover and follow shape of the at least one housing wall;
    wherein the electrically heated textile has a radially exterior side facing the housing wall, the textile exterior side embedded into the at least one housing wall interior surface, wherein synthetic material of the at least one housing wall penetrates into the textile fabric, firmly integrating the electrically heated textile into the at least one housing wall, forming a composite wall structure of textile and housing wall material in the at least one housing wall, thereby adding addition stiffness as a composite to the at least one housing wall.

2. The fluid-guiding housing according to claim 1, wherein the fabric or knitted fabric further includes electrically non-conductive fibers or yarns.

3. The fluid-guiding housing according to claim 1, wherein the electrically heating textile (32; 132) is resilient in at least one direction.

4. The fluid-guiding housing according to claim 1, wherein the electrically heating textile (32; 132) has a radial inner side facing the interior space (26; 126) of the housing (12; 112) and exposed to the fluid.

5. The fluid-guiding housing according to claim 1, wherein the at least one wall (18, 20; 120) is made of synthetic material; and
    wherein the electrically heating textile (32; 132) is overmolded onto or molded into the at least one wall (18, 20; 120).

6. A fluid-guiding housing of an internal combustion engine, comprising:
    a housing (12; 112) enclosing an interior space within, the housing including
        an electrically operated heating device (33; 133) arranged within the interior space and heating fluid in the housing (12; 112);
    wherein at least one wall (18, 20; 120) of the housing (12; 112) is equipped with an electrically heating textile (32; 132) secured to said at least one interior side of the at least one housing wall;
    wherein the electrically heated textile is a woven or knitted textile fabric including electrically conductive fibers or yarns,
    wherein the electrically conductive fibers or yarns of the electrically heated textile are arranged on and secured directly onto the interior side of the at least one housing wall and fit tightly against, cover and follow shape of the at least one housing wall;
    wherein the electrically heated textile has a radially exterior side facing the housing wall that is glued onto the interior side of the at least one wall of the housing forming a composite wall structure of textile and housing wall material on the at least one housing wall, thereby adding addition stiffness as a composite to the at least one housing wall.

7. The fluid-guiding housing according to claim 1, wherein the fluid-guiding housing is a component of an air, fuel, oil or water fluid filter (10), or of an oil pan (112) or a crankcase vent line.

* * * * *